US009249269B2

(12) United States Patent
Biggin et al.

(10) Patent No.: US 9,249,269 B2
(45) Date of Patent: Feb. 2, 2016

(54) FOAM COMPOSITION

(75) Inventors: Ian Stuart Biggin, Hull (GB); Martin Peter Butters, Bradford (GB); Anne Frances Hooley, Wakefield (GB)

(73) Assignee: BASF SE, Ludwigshafen (DE)

(*) Notice: Subject to any disclaimer, the term of this patent is extended or adjusted under 35 U.S.C. 154(b) by 783 days.

(21) Appl. No.: 13/382,034

(22) PCT Filed: Jun. 15, 2010

(86) PCT No.: PCT/EP2010/058350
§ 371 (c)(1),
(2), (4) Date: Feb. 21, 2012

(87) PCT Pub. No.: WO2011/000686
PCT Pub. Date: Jan. 6, 2011

(65) Prior Publication Data
US 2012/0138275 A1 Jun. 7, 2012

(30) Foreign Application Priority Data
Jul. 3, 2009 (GB) .................................. 0911562.7

(51) Int. Cl.
*C08J 9/00* (2006.01)
*B32B 15/04* (2006.01)
*C08J 9/32* (2006.01)
*C08J 9/40* (2006.01)
*C09K 5/06* (2006.01)
*F28D 20/02* (2006.01)

(52) U.S. Cl.
CPC .............. *C08J 9/0004* (2013.01); *B32B 15/046* (2013.01); *C08J 9/0009* (2013.01); *C08J 9/32* (2013.01); *C08J 9/40* (2013.01); *C09K 5/063* (2013.01); *F28D 20/023* (2013.01); *B32B 2260/046* (2013.01); *B32B 2307/302* (2013.01); *C08J 2301/00* (2013.01); *Y02E 60/145* (2013.01); *Y10T 428/24999* (2015.04); *Y10T 428/249986* (2015.04); *Y10T 428/249999* (2015.04)

(58) Field of Classification Search
CPC .............. C08J 9/0009; C08J 9/32; C08J 9/40; C08J 2301/00; C08J 2301/22; C09K 5/063; F28D 20/023; Y02E 60/145
See application file for complete search history.

(56) References Cited

U.S. PATENT DOCUMENTS

| | | | |
|---|---|---|---|
| 3,591,090 A | | 7/1971 | Carden |
| 4,172,735 A * | | 10/1979 | Wegerhoff et al. ........ 106/18.12 |
| 4,824,823 A | | 4/1989 | Pietsch et al. |
| 5,626,936 A | | 5/1997 | Alderman |
| 5,637,389 A * | | 6/1997 | Colvin et al. ............. 428/308.4 |
| 5,722,482 A | | 3/1998 | Buckley |
| 5,744,152 A | | 4/1998 | Langley et al. |
| 5,770,295 A * | | 6/1998 | Alderman ........................ 428/68 |
| 5,804,297 A * | | 9/1998 | Colvin et al. ................. 428/327 |
| 5,851,338 A * | | 12/1998 | Pushaw ........................ 156/278 |
| 6,265,457 B1 | | 7/2001 | Dolgopolsky et al. |
| 2002/0132091 A1 | | 9/2002 | Worley |
| 2002/0147242 A1 | | 10/2002 | Salyer et al. |
| 2003/0018102 A1 | | 1/2003 | Weston et al. |
| 2003/0143388 A1* | | 7/2003 | Reeves et al. ............. 428/311.11 |
| 2004/0031246 A1 | | 2/2004 | Springs |
| 2004/0141539 A1 | | 7/2004 | Delgado, Jr. et al. |
| 2004/0154784 A1 | | 8/2004 | Pause |
| 2006/0111001 A1 | | 5/2006 | Kosny et al. |
| 2006/0235099 A1* | | 10/2006 | Kamite et al. ............. 521/109.1 |
| 2007/0224899 A1 | | 9/2007 | Dungworth et al. |
| 2009/0227451 A1* | | 9/2009 | Rose et al. .................... 504/100 |
| 2010/0022697 A1* | | 1/2010 | Rodriguez Romero et al. ............................ 524/461 |
| 2010/0036024 A1 | | 2/2010 | Menning |
| 2011/0117353 A1* | | 5/2011 | Henshaw et al. ............. 428/221 |

FOREIGN PATENT DOCUMENTS

| | | |
|---|---|---|
| DE | 35 45 803 | 7/1986 |
| DE | 20 2008 012 387 | 2/2009 |
| DE | 20 2008 012 387 U1 | 2/2009 |
| EP | 0 356 239 | 2/1990 |
| EP | 0 356 240 | 2/1990 |
| EP | 0 623 662 | 11/1994 |
| EP | 1 251 954 | 10/2002 |
| EP | 1 498 680 | 1/2005 |
| EP | 1 740 302 | 1/2007 |
| GB | 1 275 712 | 5/1972 |
| GB | 1 475 229 | 6/1977 |
| GB | 1 507 739 | 4/1978 |
| JP | 2006-249587 A | 9/2006 |
| WO | 97 24178 | 7/1997 |
| WO | WO 97/24178 | 7/1997 |
| WO | 00 35997 | 6/2000 |
| WO | 2005 057119 | 6/2005 |

(Continued)

OTHER PUBLICATIONS

Translation of KR 10-2006-0110492, Yoon, Jae-Man, "Disposable Diaper Including Phase Change Materials", Oct. 25, 2006, 14 pages.*
International Search Report Issued May 25, 2011 in PCT/EP10/58350 Filed Jun. 15, 2010.
International Search Report and Written Opinion issued May 25, 2011 in patent application No. PCT/EP2010/058350 filed Jun. 15, 2010.
United Kingdom Search Report issued Nov. 10, 2009 in patent application No. GB0911562.7.

(Continued)

*Primary Examiner* — Hai Vo
(74) *Attorney, Agent, or Firm* — Oblon, McClelland, Maier & Neustadt, L.L.P.

(57) ABSTRACT

A foam composition comprising, A) a cellulose foam matrix, and B) particles of encapsulated organic phase change material which are distributed within the cellulose foam matrix. The invention also relates to a method for making the foam composition and also their use in thermal storage applications, such as air-conditioning units.

19 Claims, No Drawings

(56) References Cited

FOREIGN PATENT DOCUMENTS

WO    WO 2007107171 A1 *   9/2007
WO    2008 052122    5/2008

OTHER PUBLICATIONS

Ryan Coda, "A study of Cellulose Based Biodegradable Foams and Sponges", Georgia Institute of Technology, May 2005, pp. 1-62 plus cover pages.

* cited by examiner

FOAM COMPOSITION

The present invention relates to a foam composition containing particles of encapsulated organic phase change material. The foam composition and shaped articles formed from the foam composition are suitable for temperature regulation, for instance in heat exchangers or air conditioning systems for the regulation of air temperature.

Compositions for thermal energy storage are well known. Latent heat storage materials can be used in a variety of situations where it is important to absorb or release heat at one time and to release or absorb heat at another time. Generally a latent heat storage material may be defined as a compound, or mixture of compounds, that will reversibly undergo a modification or change of state with accompanying release or storage of latent heat. Since the change in state of a thermal energy material tends to be a change in phase, it is usual to refer to these materials as phase change materials (PCMs). Phase change materials will absorb or release heat energy during phase transitions between any of solid, liquid and vapour. Normally this will be solid to liquid, liquid to solid, liquid to vapour or vapour to liquid. Phase change materials will generally be chosen with a phase change temperature suitable for the intended application in order to regulate temperatures within a desired temperature band, protect against temperature extremes or storage of heat or cold.

It is known to use phase change materials in various compositions or articles for the regulation of temperature.

WO2005057119 describes a phase change heat exchanger for thermally conditioning a fluid which contains an open cell foam structure with interconnected ligaments containing a phase change material configured to receive thermal energy of the fluid from the ligaments of the foam structure. The foam structure can be metallic such as aluminium; ceramics based upon for instance aluminium oxide; refractories such as carbides; or organic polymers such as polyaromatic ethers. The phase change material includes paraffinic hydrocarbons.

EP1498680 reveals an open cell melamine formaldehyde foam through which a heat carrier is passed. The foam may contain phase change material.

WO2008052122 describes foams containing phase change materials. The foams are made from one of very many types of thermoplastic polymers.

US2004031246 suggest the use of a foam body made up of a variety of suitable foams and select various materials including cellulose acetate. This foam is also said to include micron sized phase change microcapsules.

US2004154784 describes the employment of phase change materials with different melting temperature ranges in different components of an automobile. The phase change material is preferably incorporated in a polymeric compound structure, or in an elastomeric compound structure, or any foam structure in order to enhance the overall thermal capacity.

WO0035997 refers to an isocyanate-based polymer foam containing particulate material having an enthalpy of endothermic phase transition of at least about 50 J/g. Typically the particulate material is a phase change material which may be crystalline or non-crystalline; highly crystalline polymers and semi-crystalline polymers are preferred.

US2002132091 concerns a temperature regulating fabric such as a flexible cloth or textile sheet, a flexible film, a flexible plastic sheet, a flexible paper, a flexible foam, or a flexible leather including a continuous coating on at least one side containing phase change material or microencapsulated phase change material.

US2002147242 relates to a micropore open cell foam composite comprising an open cell foam having an open cell content greater than 8% volume and an average pore size of about 1 to 200 μm and a phase change material containing in the interstices of the micropore open cell foam in an amount of about 80% volume or greater. Polyurethane foam is suggested.

US5722482 describes a flexible composite material comprising a matrix material containing phase change material which may be microencapsulated particles. The matrix material may be a solid polymer matrix or it may be an open or closed cell polymer foam. Satisfactory matrix materials are said to include latex, silicone, polyurethane, polyurethane foam and other natural and synthetic rubbers. A long list of other suitable materials include ABS, acetal, acrylic, alkyd, allyl, amino, cellulosic, epoxy, fluoroplastics, liquid crystal polymers, nylon, phenolic, polyamide, polyimide etc.

German Utility Model 202008012387 U describes the use of foams containing phase change material for air conditioning systems.

US2006111001 describes a composite thermal insulation material which includes cellulosic fibre matrix components and a phase change material dispersed therein.

It is an objective of the present invention to provide a composition or article containing phase change material that provides better performance in thermal storage applications.

It is also an objective to provide a composition or article containing phase change material suitable for regulating the temperature of air or other fluids which allows improved heat capacity.

According to the present invention we provide a foam composition comprising,
 A) a cellulose foam matrix, and
 B) particles of encapsulated organic phase change material which are distributed within the cellulose foam matrix.

The compositions can be used in a variety of thermal storage applications, for instance thermal storage units including heat exchangers. The compositions may also be formed into or incorporated into articles suitable for use in thermal storage applications. It may also be desirable to provide the compositions or articles containing the compositions in particular shapes and sizes.

We have found that the compositions and articles made therefrom achieve the aforementioned objectives.

The invention is also directed to a process for preparing the aforementioned foam composition. This process comprises the steps of:
 i) providing a cellulose foam matrix (A);
 ii) introducing a dispersion of the particles of encapsulated organic phase change material (B) into the cellulose foam matrix (A);
 iii) drying the product of step (ii) and thereby forming the foam composition.

The dispersion of encapsulated phase change material may be introduced into the cellulose foam matrix by a variety of techniques. For instance a stream carrying the dispersion may be flowed through the cellulose foam. Alternatively, the cellulose foam may be submerged in a bath containing the dispersion of encapsulated phase change material. Preferably the cellulose foam matrix is compressed and brought into contact with the dispersion and then allowed to expand so as to imbibe the dispersion throughout the cellulose foam matrix.

One way of achieving this is to compress the cellulose foam matrix before it is contacted with the dispersion. A preferred way is to submerge the cellulose foam matrix into a bath containing the dispersion and then compressing the cellulose foam matrix to expel air from within the foam matrix followed by expanding the foam matrix whilst it is submerged in the dispersion of encapsulated base change material so as to imbibe it within the foam matrix. It may also be desirable for the dispersion in the bath to be a flowing stream.

It may be desirable to use a conveyed system to introduce the dispersion of encapsulated phase change material into the foam matrix. This system may consist of rollers through which the cellulose foam matrix is passed prior to being immersed in the dispersion contained in a bath or other suitable container. In addition to conveying the foam matrix so that it is introduced into the dispersion, the rollers may also compress the foam matrix so as to expel air from within the foam matrix. At least one roller may be present within the bath such that air is expelled from the conveyed foam within the bath. Rollers may also be present when the foam matrix emerges from the bath. The foam matrix may be fed through in a continuous or semi-continuous manner. It may also be desirable to force the dispersion into the cellulose foam matrix by applying pressure or by applying vacuum. The latter may also assist in removing air expelled from the foam and is therefore preferred. Any excess dispersion may be removed from the surface of the foam by the use of a scraper or other suitable implement. A suitable antifoam or defoamer may be added to the dispersion prior to contact with the foam to aid the removal of air bubbles. The plant and equipment required to produce the foam composition of the invention may be combined with the plant used to manufacture the cellulose foam matrix.

The dispersion of particles of encapsulated phase change material may be in any suitable volatile liquid that does not adversely affect the encapsulated phase change material. However, in general the encapsulated phase change material will be in the form of an aqueous dispersion.

The product resulting from the step of introducing the dispersion into the foam matrix will need to be dried in order to remove extraneous liquid. This wet product or wet foam matrix may be dried by a variety of suitable techniques. One possibility is to place the wet product into a drying atmosphere to allow evaporation of the liquid. The wet product may be subjected to elevated temperatures for instance at least 30° C. and usually at least 50° C. The temperature used should be high enough to conveniently dry the foam matrix but nevertheless should not be so high as to damage the final product in any way. Very high temperatures usually should be avoided in order to prevent the risk of bringing about deleterious effects to the foam composition of the present invention, for instance damage to the phase change material microcapsules. The temperature may be as high as 200° C. although it is normally no higher than 150° C. and usually up to 110° C. or even up to 100° C. A preferred range is between 50° C. and 110° C., more preferably between 60° C. and 100° C.

Preferably the drying process should employ an air flow. The temperature used should be sufficient to dry the foam matrix although not so high as to damage the final product in any way. Alternatively drying may be achieved by passing air at a relatively cool or an ambient temperature over the wet matrix. The temperature of the flowing air may be as low as 10° C. or 15° C. but in general will be at least 20° C. or 25° C. Preferably, however, the air temperature of the flowing air stream should be at least 30° C. and often at least 50° C. and preferably at least 60° C. The temperature of the flowing air may even be as high as 200° C. but normally will be no higher than 150° C. and often no higher than 110° C. and preferably up to 100° C. A preferred range of temperature is between 50° C. and 110° C. more preferably between 60° C. and 100° C. In addition to drying using a positive air pressure drying may alternatively be achieved by the action of a vacuum.

The drying step results in the desired cellulose foam composition.

The wet matrix may be molded or shaped and then dried to provide the final cellulose foam composition having the desired shape. The inclusion of plasticisers may be useful in order to form a flexible composition. However, it is preferred that the composition is substantially rigid. Compositions having particular shapes may be particularly suitable for incorporation into thermal storage or thermal regulation devices.

The cellulose foam matrix composition of the present invention will desirably contain the particles of phase change material distributed throughout the cellulose foam matrix. Suitably the particles of phase change material may be physically bound within the pores of the foam. This may be as a result of the foam expanding whilst in contact with, especially submerged in, the dispersion of phase change material and then the foam contracting in the drying process.

We have found that the use of cellulose foam matrix produces high density products compared to other foam compositions The cellulose foam matrix utilized in the invention may also commonly be described as cellulose sponge or regenerated cellulose foam or sponge. Generally cellulose foams described as sponge cloth may also be suitable in this invention. The use of the term sponge cloth is sometimes intended to indicate a stronger type of cellulose foam, perhaps one with a higher density and/or reinforced with a fibre, mesh, scrim or such like.

The cellulose foam matrix should be porous, whereby the pores are open rather than closed such that liquids and dispersions are easily absorbed. We have found that the open porous structure provides enhanced adsorption of the aqueous dispersion of microencapsulated phase change material.

Preferably the cellulose foam matrix is substantially hydrophilic in nature. By this we mean that it has an affinity for water or aqueous liquids. This is particularly useful in preparing the foam composition when the dispersion of phase change material is an aqueous dispersion, as is preferred.

The cellulose foam matrix typically contains a range of pore sizes but on average the pore sizes in its expanded, wet form will tend to be larger than the volume average size of the encapsulated phase change material in order to allow the particles to penetrate throughout the body of the foam matrix. Preferably the pore size distribution will be such that substantially all of the microcapsules are absorbed into the foam.

The structure and pore size of the foam may be characterised using Scanning Electron Microscopy (SEM). Foams are fully wetted with water and are then air dried prior to undertaking SEM. SEM reveals that the pore structure of the cellulose foams may vary considerably. Some cellulose foams comprise a more ordered, mesh-like pore structure in which the pores or voids are interconnecting. Other foams are much less ordered, with the pores or voids, which are interconnected, being formed between random layers of cellulose strands. The pores or voids, which vary in shape, may be up to around 2 mm in size (longest dimension) but are usually up to around 1 mm and most often up to around 0.5 mm. Numerous considerably smaller voids are also visible by SEM.

When the cellulose foam is penetrated by water or water-based dispersion then it usually expands by up to around 10% in all dimensions (though not necessarily equally), thus it is likely that the shape and dimensions of the pores or voids will change with the pores generally expanding. The thickness of compressed foams may expand significantly more than 10% when absorbed with water or water-based dispersion.

Cellulose from which the cellulose foam matrix is produced is a polysaccharide mainly obtained from wood pulp and cotton. Cellulose is water insoluble and cellulose foams suitable in this invention are generally produced from a liquid form of cellulose. A liquid form may be prepared by dissolving cellulose in a suitable aqueous solvent such as cupriethylenediamine hydroxide, cuprammonium hydroxide or an amine oxide such as N-methylmorpholine N-oxide. Porous foam is produced when the solid cellulose material is reformed by the addition of the dissolved cellulose into a precipitating solvent such as water. Pores may be formed by various techniques, for example by the pre-foaming of the dissolved cellulose liquor prior to the precipitation step or by the addition of salt crystals to the dissolved cellulose liquor prior to the precipitation step. In the latter case, pores are formed as the salt crystals dissolve into water during and/or after the precipitation step. A common process for the production of regenerated cellulose foam matrix involves the use of a water soluble form of cellulose known as "viscose". The process for producing foam using viscose is sometimes referred to as the "viscose process". A water soluble form of cellulose is produced by the conversion of cellulose to the sodium cellulose form by the addition of sodium hydroxide and then to the xanthate form by treatment with carbon disulphide. "Viscose" is the term used to describe the xanthate form, which is usually a viscous, coloured liquid or gel. Salt crystals such as sodium sulphate decahydrate or trisodium phosphate are added to the viscose prior to the regeneration step. The resulting paste may contain in excess of 50% by weight of salt crystals. In the regeneration step, the viscose paste (containing salt crystals) is placed in a bath of sulphuric acid or water. Regeneration occurs as the cellulose xanthate returns to cellulose with the loss of carbon disulphide (which is usually recovered and recycled in the process). The pores are formed as the salt crystals melt and dissolves. It is also possible to regenerate cellulose from the viscose/salt paste by heat treatment without the use of a bath.

The average degree of polymerization of the cellulose in the viscose liquor is generally 100 to 2000, preferably 200 to 1000 and most preferably 300 to 800. Regenerated cellulose from the viscose process has a unit cell structure designated as Cellulose II, or is predominantly this form, and is preferred for the cellulose foam matrix of this invention.

A published thesis by Ryan Coda, Georgia Institute of Technology (May 2005), entitled "A Study of Cellulose Based Biodegradable Foams and Sponges" provides more background to the production and properties of cellulose foams. Preferably the cellulose foam matrix used to form the foam composition of the present invention should comprise mostly cellulose in which hydroxyl groups on the repeating saccharide units are not esterified and therefore exist as free hydroxyl groups. Preferably at least 50% of the hydroxyl groups in the cellulose of the cellulose foam matrix should not be esterified and therefore exist as free hydroxyl groups. More preferably they should be at least 70%, more preferably still at least 80%, in particular at least 90% especially at least 95% and even as much as 99% or 100%.

Irrespective of the soluble form of cellulose that is used, the cellulose foam matrix may be produced by regenerating the cellulose contained in moulds or as an extrudate from the continuous or semi-continuous extrusion of the cellulose.

Fibres, mesh or scrim and the like may be present in the cellulose foam matrix to reinforce the foam. Such fibres, mesh or scrim may be produced from viscose, cotton, nylon or numerous other suitable materials. The cellulose foam matrix may comprise 0 to 30% by weight of fibres, mesh or scrim, preferably 0.5 to 20% and most preferably 1 to 10%.

Cellulose foam useful in the present invention can contain up to 15% by weight of moisture. Steps may be taken to reduce the moisture content but this is not usually necessary for preparing inventive compositions.

The cellulose foams used in this invention may be up to several meters in length and width. The width and length mainly depend on the process being used for imbibing microencapsulated PCM dispersion into the foam. If a continuous process is used then the cellulose foam may be fed from a roll of several meters long and up to 3 meters wide. The thickness may also vary from 0.5 mm to 50 mm or more. Preferably the thickness is 1 to 20 mm and most preferably 2 to 15 mm. The aforementioned thicknesses relate to cellulose foam completely wetted with deionised water. This is to allow for the fact that the thickness of cellulose foams can increase when wetted with water or other aqueous fluids, and this particularly the case for compressed cellulose foams.

Compressed cellulose foams are cellulose foams where mechanical pressure has been applied to reduce the thickness of the foam, such that a smaller volume is occupied by a fixed mass of foam to reduce the costs of transportation, storage and packaging. It is known, for example, to compress foam of approximately 10 mm thickness to approximately 2 mm thickness. Compressed foams will expand when wetted with water or other aqueous fluid. Compressed foams may be utilized in this invention, however it may be necessary to allow additional time for the full absorption of the encapsulated PCM dispersion into the foam. Alternatively the compressed cellulose foam may be expanded by the addition of water, and dried if desired, prior to treatment with the dispersion.

Suitable cellulose foams have a density of 0.005 kg/liter to 0.6 kg/liter. Preferably the density is 0.01 kg/liter to 0.4 kg/liter and most preferably 0.04 to 0.25 kg/liter. The density is determined by weighing a foam that has been completely wetted with water and then air-dried to constant weight.

Foams may be treated with an antimicrobial agent to prevent fouling of the cellulose foam.

The particles of encapsulated organic phase change material includes any particles which contain organic phase change material. Preferably the particles comprise a core of organic phase change material within an outer shell. Generally such particles containing phase change material within an outer shell may be referred to as core/shell particles or usually capsules or microcapsules. The particles may be obtained by any suitable encapsulation process resulting in encapsulated organic phase change material (PCM). Sometimes the encapsulated organic phase change material may be referred to as microencapsulated organic phase change material or micro-PCM particularly where the particle size is relatively small, for instance volume average particle size below 50 $\mu$m. Similarly the encapsulation process for obtaining microencapsulated organic phase change material may be referred to as microencapsulation.

Suitable organic phase change materials are organic, water insoluble materials that undergo solid-liquid/liquid-solid phase changes at useful temperatures (typically between 0 and 80° C.). Generally the enthalpy of phase change (latent heat of fusion and crystallization) is high. Suitable organic phase change materials exhibit a high enthalpy of phase change, typically greater than 50 J/g, usually at least 90 J/g, preferably at least 100 J/g, more preferably greater than 120 J/g and most preferably greater that 150 J/g when determined by Differential Scanning calorimetry (DSC) as measured using a Perkin Elmer DSC1 at a scan speed of 5° C./minute.

Suitable organic phase change materials include (but are not limited to) substantially water insoluble fatty alcohols, glycols, ethers, fatty acids, amides, fatty acid esters, linear hydrocarbons, branched hydrocarbons, cyclic hydrocarbons, halogenated hydrocarbons and mixtures of these materials. Alkanes (often referred to as paraffins), esters and alcohols are particularly preferred. Alkanes are preferably substantially n-alkanes that are most often commercially available as mixtures of substances of different chain lengths, with the major component, which can be determined by gas chromatography, between $C_{10}$ and $C_{50}$, usually between $C_{12}$ and $C_{32}$. Examples of the major component of an alkane organic phase change materials include n-octacosane, n-docosane, n-eicosane, n-octadecane, n-heptadecane, n-hexadecane, n-pentadecane and n-tetradecane. Suitable ester organic phase change materials comprise of one or more $C_1$-$C_{10}$ alkyl esters of $C_{10}$-$C_{24}$ fatty acids, particularly methyl esters where the major component is methyl behenate, methyl arachidate, methyl stearate, methyl palmitate, methyl myristate or methyl laurate. Suitable alcohol organic phase change materials include one or more alcohols where the major component is, for example, n-decanol, n-dodecanol, n-tetradecanol, n-hexadecanol, and n-octadecanol.

It is also possible to include a halogenated hydrocarbon along with the main organic phase change material.

Organic phase change materials are preferably substantially water insoluble, as the encapsulated phase change material is preferably prepared as an aqueous dispersion.

The encapsulated phase change material typically exists as freely dispersed particles in the dispersion. Typically encapsulated organic phase change materials comprise the organic phase change material and optional additives such as a halogenated paraffin or a nucleating agent which is surrounded by a shell that is impermeable to the phase change material. In any encapsulated form the organic phase change material is completely surrounded and entrapped by the shell and is protected against contamination. When the shell is robust, the organic phase change material is more securely contained and less likely to escape from the capsules and compositions comprising capsules. Details of the robust character of the capsule particles are provided below.

In preparing the foam composition of the present invention, it is preferable that the dispersion of the particles of encapsulated phase change material is in the form of an aqueous dispersion. More preferably the concentration of particles of encapsulated phase change material particles in the dispersion should be as high as possible. Typically the concentration should be between 15% and 60% by weight. Preferably the concentration should be between 25% and 50% by weight and most preferably between 35% and 45%. The concentration of particles of encapsulated phase change material particles should not be too low in the dispersion as this can result in a low concentration of phase change material in the resulting foam composition. If the concentration of phase change material in the foam composition is too low then it may give unacceptable results in the heat storage applications.

The dispersion of encapsulated phase change material may have relatively high fluidity, for instance 10 mPa·s or less (Brookfield LVT viscometer, spindle 0 when measured at 25° C.). However, extremely low viscosity dispersions may contain low concentrations of encapsulated phase change material. Normally, low viscosity dispersions are acceptable provided that they contain a sufficient concentration of phase change material. Usually the dispersion will exhibit a higher viscosity, especially when the concentration of encapsulated phase change material particles is high in the dispersion. It is still practical to use higher viscosity dispersions provided that the physical limitations of the viscosity do not inhibit the penetration or absorption of the dispersion. Typically the viscosity of the dispersion may be in the range of 10 to 10,000 mPa·s preferably in the range 50 to 2,000 mPa·s, more preferably in the range 50 to 750 mPa·s (using a Brookfield RVT or LVT viscometer with an appropriate spindle and speed measured at 25° C.).

Aqueous dispersions of smaller capsules tend to exhibit the favourable property of better stability (reduced capsule creaming or settling) and the unfavourable property of increased viscosity compared to a dispersion of larger sized capsules at an equivalent concentration. It is also generally more difficult to prepare suitable capsules with very small particle sizes and/or the process required is more costly due to the extra processing that is required and/or the use of more specialized equipment. A balance must be found between these advantages and disadvantages and a volume mean diameter (VMD) of capsules (when in the form of an aqueous dispersion) of between 0.2 µm and 50 µm is usually chosen. Preferably the VMD of the capsules in an aqueous dispersion is between 0.7 µm and 20 µm and more preferably between 1 µm and 10 µm. VMD is determined by a Sympatec Helos particle size analyzer or another technique found to give results for microcapsules that are in very good agreement with the results from a Sympatec Helos analyzer.

The particles of encapsulated organic phase change material may be produced by any known process, for instance described in the prior art. Where the particles are in the form of capsules or microcapsules they may be produced by any suitable process which results in capsules with a substantially core-shell configuration. The core comprises of organic phase change material and the shell comprises of encapsulating polymeric material. Usually the capsules are substantially spherical. Preferably the shell is durable such that the organic phase change material is protected from contamination and cannot easily escape from the capsules. Thermogravimetric analysis (TGA) provides an indication of the robustness of the capsules. "Half Height" is the temperature at which 50% of the total mass of dry (water-free) capsules is lost as a fixed mass of dry capsules is heated at a constant rate. In this analysis method mass may be lost due to organic phase change material escaping as vapour permeating through the shell and/or due to rupturing of the shell. Particularly suitable microcapsules of organic phase change material (in the 1 µm to 5 µm mean particle size range) have a Half Height value greater than 250° C., preferably greater than 300° C. and more preferably greater than 350° C., when TGA is carried out using a Perkin-Elmer Pyris 1 at a rate of 20° C. per minute in a nitrogen atmosphere using typically 5 to 50 mg of dry sample.

The shell that is formed around the core provides protection for and prevents loss of the primary phase change material which optionally includes an additive such as a nucleating material. The amount of shell material and amount of core material is chosen to give durable capsules containing the maximum amount of core material and hence maximum latent heat capacity. Frequently the core material forms at least 20% by weight of the capsule, preferably 50% to 98% and most preferably 85% to 95%.

Capsules may be formed by any convenient encapsulation process suitable for preparing capsules of the correct configuration and size. Various methods for making capsules have been proposed in the literature. Processes involving the entrapment of active ingredients in a matrix are described in general for instance in EP-A-356,240, EP-A-356,239, U.S. Pat. No. 5,744,152 and WO 97/24178. Typical techniques for forming a polymer shell around a core are described in, for instance, GB 1,275,712, 1,475,229 and 1,507,739, DE 3,545, 803 and U.S. Pat. No. 3,591,090.

The encapsulation process leading to preferred core/shell capsules usually involves the formation of a dispersion of the organic phase change material (optionally including an additive such as a nucleating agent where required) in water. The organic phase change material (optionally including an additive such as a nucleating agent) is usually in a molten state, to produce droplets of a certain diameter necessary to give the desired capsule particle size prior to forming a shell around the organic phase change material. Thus, for organic phase change material in encapsulated form, it is important that the organic phase change material is substantially water insoluble. Suitable organic phase change materials include those described earlier that are substantially water insoluble.

Capsules of core shell configuration may be formed from a number of different types of materials including aminoplast materials, particularly using melamine and urea e.g. melamine-formaldehyde, urea-formaldehyde and urea-melamine-formaldehyde, gelatin, epoxy materials, phenolic, polyurethane, polyester, acrylic, vinyl or allylic polymers etc. EP1251954 discloses microcapsules with acrylic copolymer shell material formed from acrylic monomers. Capsules whose shells are composed of formaldehyde resins or cross-linked acrylic polymer as specified in this patent or patent EP1740302 are preferred as these are usually very robust as indicated by thermogravimetric analysis. Acrylic types are particularly preferred as they are robust and do not liberate the toxic substance formaldehyde unlike capsules comprising formaldehyde resins.

Although it is not essential it is preferable to employ a nucleating agent to counter the effect known as supercooling or subcooling. Supercooling is the effect whereby the organic phase change material crystallizes at a lower temperature than would normally be expected of the organic phase change material. The effect is most evident when the organic phase change material is isolated in independent microscopic domains, for example in an emulsion or microencapsulated form. For example, Differential Scanning calorimetry (DSC) of microencapsulated organic phase change materials (without nucleating agent) may show one or more crystallization peaks occurring at lower temperatures than the one or more peaks for the organic phase change material in bulk (non-encapsulated) form.

Supercooling is usually undesirable as it can reduce the effective latent heat capacity of the organic phase change material. The use of a nucleating agent is particularly beneficial when the organic phase change material is in a particulate form below about 100 µm in mean diameter, particularly below about 50 µm and more particularly below about 10 to 20 µm, which is often the case when the organic phase change material encapsulated. When an effective nucleating agent is blended into the organic phase change material, supercooling is markedly reduced or eliminated. Preferably the nucleating agent is an organic material that is miscible with the organic phase change material at a temperature at which they are both molten and which exhibits a peak melting temperature at least 15° C. and preferably at least 20° C. higher than the peak melting temperature of the organic phase change material. The peak melting temperature is determined using a Differential Scanning calorimeter (DSC) and when more than one melting peak is found, the peak melting temperature is determined from the largest peak. Suitable nucleating agents include those described in EP0623662 (Mitsubishi Paper Mills). The preferred nucleating agent is selected from a paraffin wax, fatty acid ester and fatty alcohol.

Paraffin waxes are particularly useful due to their effectiveness, cost and availability. Paraffin waxes with a peak melting temperature between 40° C. and 80° C., often between 45° C. and 75° C. and most often between 50° C. and 65° C. are cost-effective and readily available. These are particularly effective nucleating agents when the organic phase change material is essentially a normal paraffin. To reduce or eliminate supercooling one or more nucleating agent(s) is/are desirably mixed with the organic phase change material at a concentration by weight of 0.5% to 30%, preferably 2% to 20%, and more preferably 5% to 15% of the total weight of PCM and nucleating agent. It is also possible to employ micro- or nanoparticles mixed into the phase change material as the nucleating agent e.g. nanoparticles of fumed silica, $TiO_2$ or other inorganic materials. In this case the micro/nanoparticle content (as a proportion of the total weight of nucleating agent particles including organic phase change material) tends to be 0.01% to 20%, preferably 0.05% to 10% and more preferably 0.1% to 5%.

The dry foam compositions of the present invention should contain at least 30% by weight of dry encapsulated PCM. However the amount of dry encapsulated PCM is preferably much higher than this, for instance at least 50% by weight, or even at least 65% by weight and most preferably at least 75% by weight. The maximum content of dry PCM microcapsules, not including polymeric binder, that can be present in the final, dry inventive composition, given that a certain amount of cellulose foam is necessary to act as a satisfactory matrix for the microcapsules, is 98% by weight, preferably 93% by weight and most preferably 90% by weight. The cellulose foam content of the dry inventive foam composition should be at least 2% by weight, preferably should be at least 5% by weight and most preferably at least 10% by weight.

It should be noted that the above values are based on a dry foam composition before any additional treatment is carried out such as covering with aluminium foil etc.

The dry foam compositions of the present invention should have a latent heat capacity, also referred to as enthalpy, of at least 30 kJ/kg. Preferably the enthalpy is much higher than this, for example at least 60 kJ/kg or even at least 80 kJ/kg and most preferably at least 100 kJ/kg. Enthalpy is determined by DSC using a Perkin-Elmer DSC Pyris 1 taking typically 5 to 50 milligrams of foam and using a scan rate of 5° C./minute. The enthalpy is determined by integrating the main peak or peaks from the melting cycle and similarly for the crystallization cycle. The base lines for the peak integration are set so as to encompass all the phase transition peaks obtained in the melting cycle and similarly for the crystallization cycle. An average of the melting and crystallization enthalpies is taken as the enthalpy of foam composition (the difference between the two values not being greater than 10%).

It should be noted that the above enthalpy values are based on a dry foam composition before any additional treatment is carried out such as covering with aluminium foil etc.

Generally the density of the foam compositions of the present invention desirably will be as high as possible, such that the enthalpy density (in units of kJ/liter) is as high as possible. Enthalpy density, or volumetric enthalpy, is particularly important as it defines the extent of latent heat storage capacity in the volume occupied by the inventive composition. Suitably the volumetric enthalpy will be at least 20 kJ/liter and is preferably much higher than this, for example at least 40 kJ/liter or even at least 50 kJ/liter and most preferably at least 70 kJ/liter. The volumetric enthalpy or enthalpy density is determined by multiplying the density of the dry foam composition by the enthalpy, in kJ/kg units, determined by DSC by the earlier defined method. The density of the dry foam composition is at least 0.4 kg/liter, preferably at least 0.6 kg/liter and most preferably at least 0.75 kg/liter (based on dry foam composition). The density may be as high as 1.3 kg/liter or higher although usually it is up to 1.1 kg/liter. The density is determined by weighing a dry inventive foam composition of known volume. The volume is determined by measuring the dimensions (length, width, thickness) of the inventive foam composition using e.g. a ruler or calipers. For such a purpose the dimensions of the foam composition must be very regular or constant in order to produce an accurate volume and hence density value.

It should be noted that the above volumetric enthalpy values are based on a dry foam composition before any additional treatment is carried out such as covering with aluminium foil etc.

It may be desirable to include other additives into the foam composition. Such additives may be incorporated with the dispersion of encapsulated phase change material prior to its introduction into the foam matrix or it may be added or applied separately, for instance the cellulose foam matrix before inclusion of the phase change material or alternatively after the dispersion of phase change material has been combined with the cellulose foam matrix.

Suitable additives may include plasticisers, flame retardant chemicals, colours, dyes, antimicrobial agents, thermal conductive additives such as graphite, binders, film forming agents, polymers such as polyvinyl alcohol, and/or additives which impart water resistance. Additives which are binders may also be film forming agents. Furthermore, additives which impart water resistance may also be binders. The inclusion of a binder is particularly preferred. Desirable levels of binder is be between 0.5% and 20% by weight, preferably 1% to 10% and most preferably 2% to 5% by weight based on dry weight of the encapsulated phase change material. It is particularly preferred for the binder to have film forming properties. A preferred binder is polyvinyl alcohol. Polyvinyl alcohol is a binder which also exhibits film forming properties. Generally the polyvinyl alcohol is prepared by partial or complete hydrolysis of polyvinyl acetate. More preferably the polyvinyl alcohol is prepared by between 90 and 98% hydrolysis of polyvinyl acetate, especially around 95%. Desirable binders include polymeric materials, more preferably also exhibiting film forming properties.

In one particularly desirable form the particles of encapsulated phase change material may be bound to the cellulose foam matrix. This may be achieved by incorporating a suitable binding agent. In one aspect the particles of phase change material contains a binder at the surface which may facilitate binding of the particles to the foam.

The foam composition of the present invention may preferably contain a binder, preferably a film forming polymer which is typically located on the exterior surface of the (B) particles of encapsulated organic phase change material. The binder is preferably incorporated into the dispersion of phase change material before it is combined with the cellulose foam matrix. More preferably, the binder is a film forming polymer, typically polyvinyl alcohol as described above, which is incorporated during the manufacture of the encapsulated phase change material. The binder may also act as a stabiliser in the formation of the particles of encapsulated phase change material in the dispersion.

A further aspect of the invention also relates to the use of the foam composition defined according to the invention in an article or a system for thermal regulation. The article may for instance be the composition possessing a particular size and shape. Alternatively the article may be a device or other entity comprising the foam composition especially adapted for thermal regulation.

A further aspect of the invention relates to the use of the foam composition of the invention in an air conditioning system for the purpose of regulating the temperature of air. In general the air will be a volume of air, for instance in a room or a building.

The invention also relates to a shaped article comprising the foam composition especially adapted for use in a temperature regulation application, in particular an air conditioning system. In this regard the shaped article may possess a particular shape and size suitable for air to be pumped through. The thickness, form and shape, for instance a particular three-dimensional shape, of the article can be varied to suit different temperature regulation devices, especially air conditioning systems. The article may for instance have a plate shape which may be particularly suitable for use within heat exchangers.

Although composition may be flexible in form, it is nonetheless preferred that it is rigid. The foam composition or article comprising it is preferably rigid and inflexible in nature once it has been formed into its final shape. This may be useful as a heat absorbing component within a cavity or duct carrying air into or around a room or a building.

The composition or article can be part of other products such as a thermal storage component in a heat storage device, heat exchanger or air conditioning unit. It may be present as a surface layer, for instance at the surface of insulation or building surface linings, especially for interior walls, ceilings and/or floors in order to provide thermal regulation within a room, building or other construction or device.

A further aspect of the invention relates to an air conditioning system comprising,
(i) a means for flowing air to and from a volume of air to be conditioned by regulation of air temperature;
(ii) a temperature regulation device, in which the temperature regulation device comprises the foam composition or article defined herein.

The following examples illustrate the invention.

EXAMPLES

Example 1

Inventive compositions are prepared using a microencapsulated phase change material (microPCM) dispersion comprising 43.5% microcapsules, 1.34% polyvinyl alcohol (Gohsenol GH-20) (microcapsule stabilizer and binder in the inventive composition) and 55.0% water. The geometry of microcapsules is core-shell. The shell is composed of a highly cross-linked acrylic copolymer and the core is composed of 92.5% by weight of octadecane and 7.5% of a paraffin wax nucleating agent. The core is 87% by weight of the weight of microcapsules and the acrylic polymer shell is 13% by weight of the weight of microcapsules. Thermogravimetric analysis is used to determine that the Half Height of the microcapsules is 375° C. The method involves an initial drying step at 110° C. for approximately 20 minutes (until stable readings are obtained) to remove water from the sample. The analysis program using a Perkin Elmer TGA Pyris 1 is then run, heating typically 5-30 milligrams of dry sample from 110° C. to 500° C. at 20° C./minute. The analysis is carried out in a $N_2$ atmosphere. The latent heat capacity of the microcapsule dispersion is 71.4 kJ/kg as determined by DSC using a Perkin-Elmer DSC Pyris 1 at 5° C./minute scan rate. The volume mean diameter of the microcapsules is 1.9 microns and the ×100 particle-size is 6.0 microns using a Sympatec Helos particle-size analyzer with R1 lens and employing the Quixcel dispersion system with the analysis carried out in water.

The dispersion has a viscosity of 164 cP as determined using a Brookfield RVT viscometer (spindle 3, 100 rpm, 25° C.) and a pH of 3.8.

The cellulose foams utilised are as follows: Spontex household sponge cloth from Mapa Spontex UK Ltd sourced via a retail outlet and Foam A (described as compressed cellulose sponge), Foam B (described as cellulose sponge cloth) and Form C (described as cellulose sponge cloth) sourced from a commercial producer in the UK. Foam A is a highly compressed cellulose foam. Samples of the foams are completely wetted with water and then air dried. The densities of the foams are as follows:
Spontex=0.13 kg/liter
Foam A=0.077 kg/liter
Foam B=0.14 kg/liter
Foam C=0.10 kg/liter Inventive compositions are prepared as follows. 5 cm×5 cm squares of cellulose foam are cut. An amount of microPCM dispersion is placed in a shallow rectangular receptacle such that the depth of microPCM dispersion is approximately 3 cm. Each 5 cm×5 cm square of foam is placed in the receptacle such that it is completely submerged in the microPCM dispersion.

A stainless steel roller of width approximately 10 cm and diameter approximately 2 cm is rolled over each foam, forward and backwards, ten times to force the air out of the foam and microPCM dispersion into the foam. In the case of Foam B and Foam C this was done immediately after submersion and in the case of Foam A this was done after 10 minutes of submersion. The foam is removed from the liquid with tweezers and after excess microPCM dispersion is allowed to drain off it is placed on a plastic tray. The foam containing absorbed microPCM dispersion is air dried at ambient temperature. The steps above are repeated using a further 5 cm×5 cm sample of foam, however in this case the foam containing absorbed microPCM dispersion is dried in a fan assisted oven at 50° C.

Once dry the microPCM/foam samples are all found to be rigid and board-like. Cutting the samples to expose the cross-sections reveals that the samples are dense with very few air voids. The samples are weighed and the dimensions measured such that the density of each sample can be determined.

5-50 mg samples are taken from each of the dry microPCM/foam samples and analyzed by DSC (Differential Scanning calorimtery) using a Perkin Elmer Pyris 1 DSC at a scan rate of 5° C./minute. The enthalpy or latent heat capacity is determined by integrating the main peak or peaks from the melting cycle and similarly for the crystallization cycle. The base lines for the peak integration are set so as to encompass all the phase transition peaks obtained in the melting cycle and similarly for the crystallization cycle. An average of the melting and crystallization enthalpies is taken as the enthalpy of the microPCM/foam composition (the difference between the two values not being greater than 10%).

The results obtained on the microPCM/cellulose foam samples are shown in Table 1.

TABLE 1

| Sample Reference | Foam | Density (kg/liter) Air Dried | Density (kg/liter) Oven Dried | Enthalpy (kJ/kg) Air Dried | Enthalpy (kJ/kg) Oven Dried | Vol. Enthalpy (kJ/liter) Air Dried | Vol. Enthalpy (kJ/liter) Oven Dried |
|---|---|---|---|---|---|---|---|
| 1.1 | Spontex | 0.674 | 0.842 | 125.9 | 129.1 | 84.8 | 108.7 |
| 1.2 | Foam A | | 0.640 | | 136.5 | | 87.4 |
| 1.3 | Foam B | 0.587 | 0.600 | 134.0 | 135.1 | 78.7 | 81.1 |
| 1.4 | Foam C | 0.668 | 0.800 | 125.5 | 139.2 | 83.8 | 111.4 |

The inventive microPCM/cellulose foam samples are found from the results above to be of high density and very high volumetric enthalpy.

Example 2

Comparative

Foam compositions are prepared using foams of different chemical and physical properties. The preparation method employed is identical to that used in Example 1.

The foams employed are obtained from Foam Techniques Ltd, Wellingborough, UK:
FT-11M—melamine foam
FT-T30 KW—polyether polyurethane foam
FT-30FRS—polyester polyurethane foam
FT-32H—combustion modified polyurethane foam
FT-40P—closed cell cross linked expanded polyethylene foam
FT-T60PPI—open cell reticulated polyether foam
FT-70/0—impregnated polyether foam The results obtained on the microPCM/foam samples are shown in Table 2.

TABLE 2

| Sample Reference | Foam | Density (kg/liter) Air Dried | Density (kg/liter) Oven Dried | Enthalpy (kJ/kg) Air Dried | Enthalpy (kJ/kg) Oven Dried | Enthalpy (kJ/liter) Air Dried | Enthalpy (kJ/liter) Oven Dried |
|---|---|---|---|---|---|---|---|
| 2.1 | FT-11M | 0.371 | 0.387 | 160.3 | 158.0 | 59.5 | 61.1 |
| 2.2 | FT030FRS | 0.354 | 0.329 | 133.8 | 152.0 | 47.4 | 50.0 |
| 2.3 | FT-T30KW | 0.298 | 0.246 | 132.8 | 139.6 | 39.6 | 34.3 |
| 2.4 | FT-32H | 0.320 | 0.297 | 186.4 | 129.4 | 59.6 | 38.4 |
| 2.5 | FT-40P | 0.093 | 0.272 | 47.0 | 69.7 | 4.4 | 18.9 |
| 2.6 | FT-T60PPI | 0.231 | 0.159 | 124.4 | 112.5 | 28.7 | 17.9 |
| 2.7 | FT70/0 | 0.229 | 0.245 | 104.8 | 88.8 | 24.0 | 21.8 |

It is found that the samples 2.1 to 2.7 have lower density and much lower volumetric enthalpy than the samples in Example 1.

The invention claimed is:

1. An article comprising a foam and a covering material wherein said covering material comprises aluminum foil and said foam comprises
A) a cellulose foam matrix formed predominantly from Cellulose II, and wherein at least 50% of hydroxyl groups on the cellulose exist as free hydroxyl groups, and
B) particles of encapsulated organic phase change material distributed within the cellulose foam matrix,
wherein the foam has a pore size distribution such that substantially all of particles (B) are absorbed into the foam,
the volume mean diameter of particles (B) when in the form of an aqueous dispersion is between 0.2μm and 50 μm, and
the foam has a volumetric enthalpy of at least 70 kJ/liter.

2. The article of claim 1, wherein the cellulose foam matrix has an open cell structure.

3. The article of claim 1, comprising at least 40% by weight, based on total weight of the foam composition, of the particles (B).

4. The article of claim 1, further comprising a binder located on an exterior surface of the particles (B).

5. The article of claim 4, comprising 2 to 5% by weight, based on the dry weight of the particles (B), of the binder.

6. The article of claim 5 wherein the binder is polyvinyl alcohol.

7. A system for thermal regulation comprising the article of claim 1.

8. An air conditioning system comprising the article of claim 1.

9. The article of claim 1, wherein the article is adapted for use in an air conditioning system.

10. The article of claim 1, comprising at least 75% by weight, based on total weight of the composition, of the particles (B).

11. The article of claim 1, wherein the particles comprise 85 to 95% by weight, based on the weight of the particles, of a core material, the remainder of the particles being a shell material.

12. The article of claim 1, having a thickness of 2 to 15 mm.

13. The article of claim 1, having a density of 0.6 to 1.3 kg/liter.

14. The article of claim 1, wherein the particles (B) comprise at least one alkane organic phase change material selected from the group consisting of n-octacosane, n-docosane, n-eicosane, n-octadecane, n-heptadecane, n-hexadecane, n-pentadecane and n-tetradecane.

15. The article of claim 1, wherein the particles (B) comprise at least one ester organic phase change material selected from the group consisting of methyl behenate, methyl arachidate, methyl stearate, methyl palmitate, methyl myristate and methyl laurate.

16. The article of claim 1, wherein the particles (B) comprise at least one alcohol organic phase change material selected from the group consisting of n-decanol, n-dodecanol, n-tetradecanol, n-hexadecanol, and n-octadecanol.

17. The article of claim 1, wherein at least 90% of hydroxyl groups on the cellulose exist as free hydroxyl groups.

18. The article of claim 1, wherein said cellulose foam matrix further comprises at least one of a fibre, a mesh or a scrim in a total amount of 0.5 to 30% by weight.

19. A process for preparing the article of claim 1 comprising
preparing said foam by a process comprising
A) a cellulose foam matrix, and
B) particles of encapsulated organic phase change material distributed within the cellulose foam matrix, the process comprising:
i) contacting a dispersion of the particles (B) with the cellulose foam matrix (A) to obtain a product; and
ii) drying the product to obtain the foam; and covering said foam with said covering material.

* * * * *